Sept. 22, 1925.
A. A. ROTH
1,554,526
FENDER FOR MOTOR VEHICLES
Filed Jan. 21, 1925     4 Sheets-Sheet 1
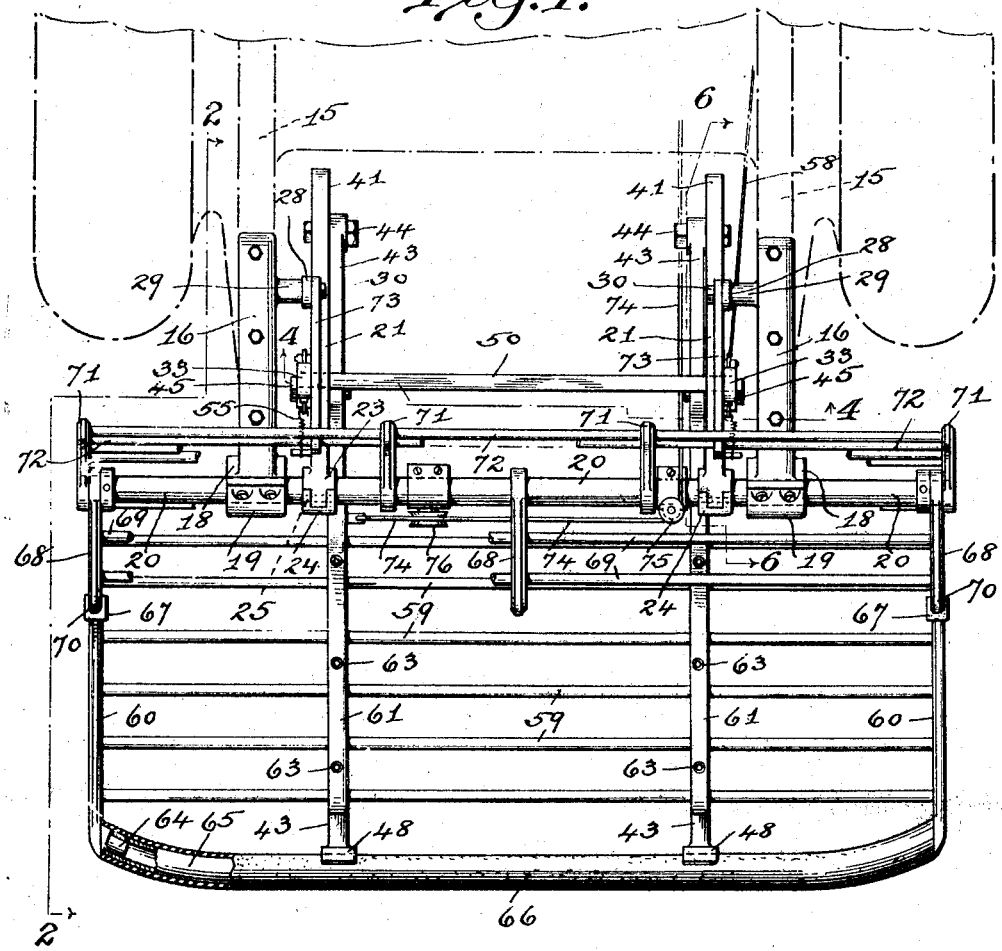
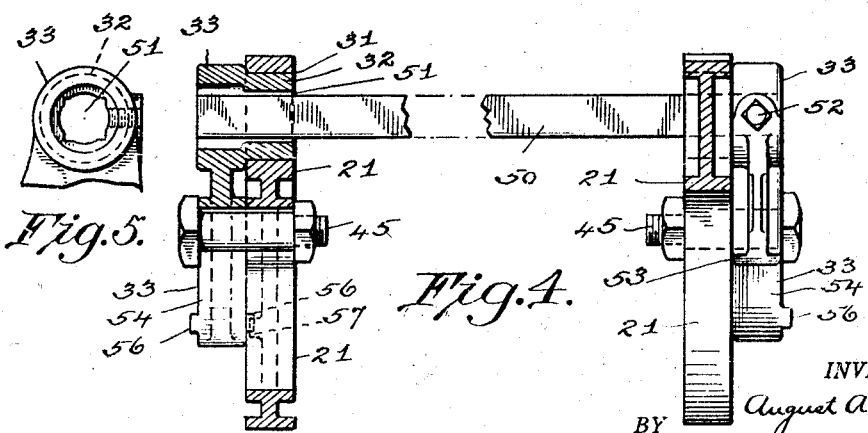
INVENTOR
August A. Roth
BY
Charles B. Mann Jr.
ATTORNEY

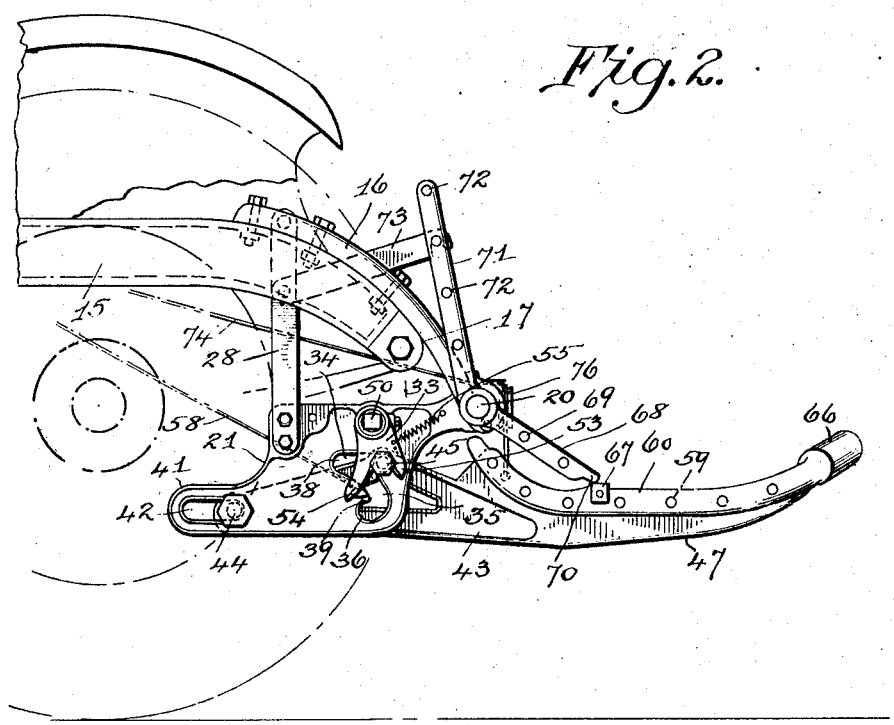

Sept. 22, 1925.
A. A. ROTH
1,554,526
FENDER FOR MOTOR VEHICLES
Filed Jan. 21, 1925
4 Sheets-Sheet 3
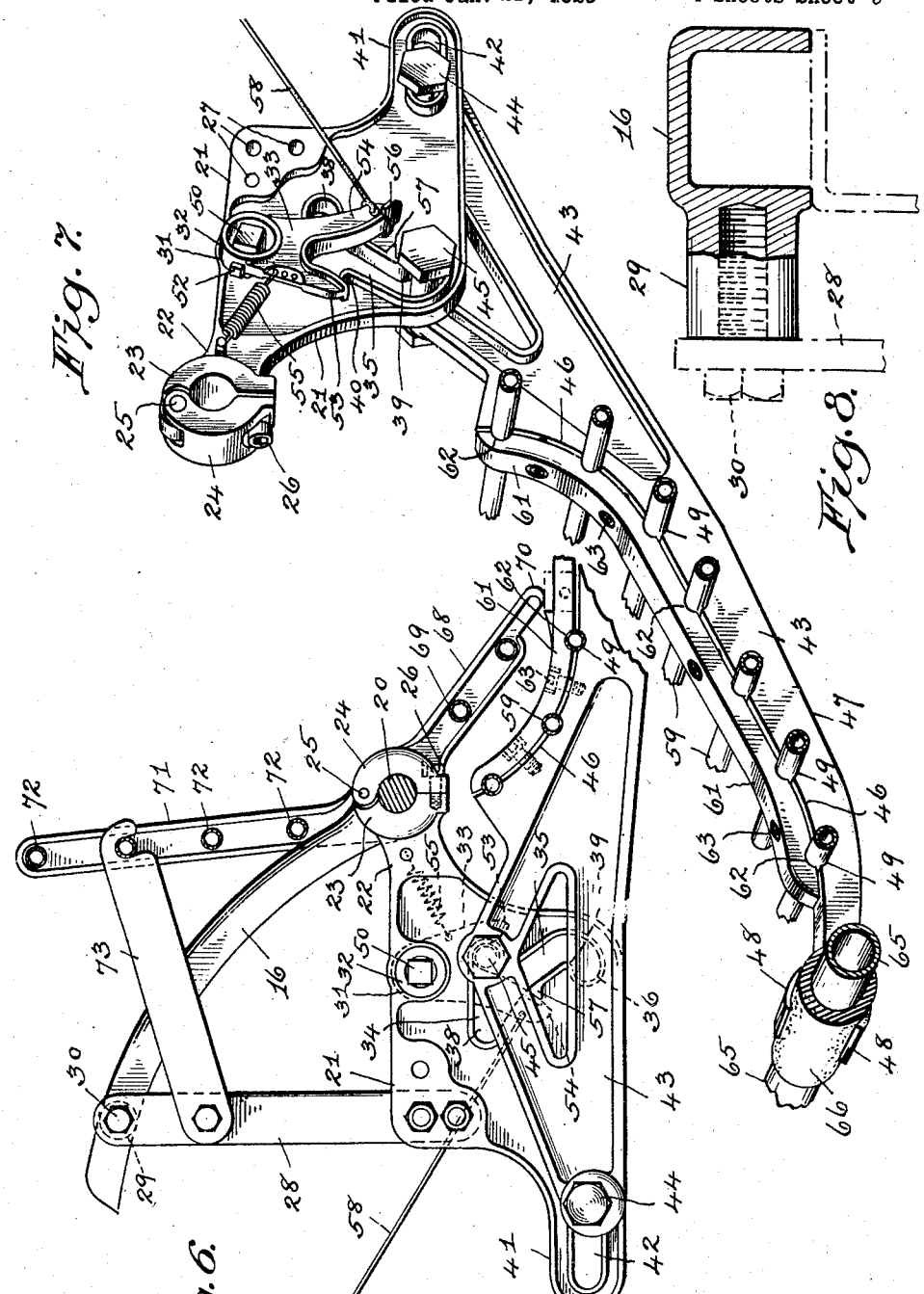
INVENTOR
August A. Roth
BY
Charles B. Mann Jr.
ATTORNEY Sept. 22, 1925.
A. A. ROTH
1,554,526
FENDER FOR MOTOR VEHICLES
Filed Jan. 21, 1925 4 Sheets-Sheet 4
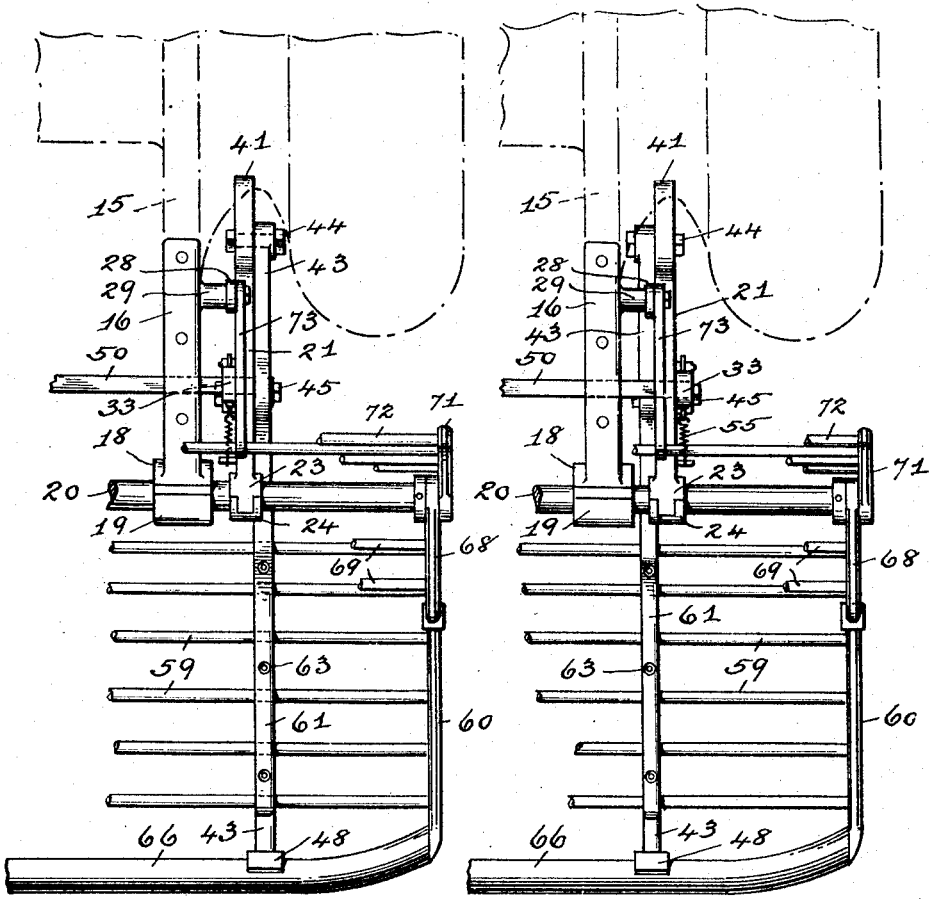
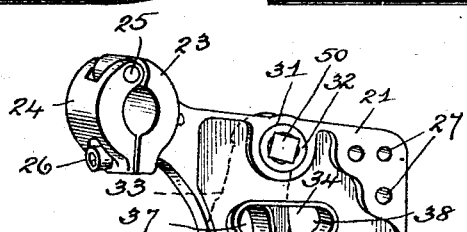
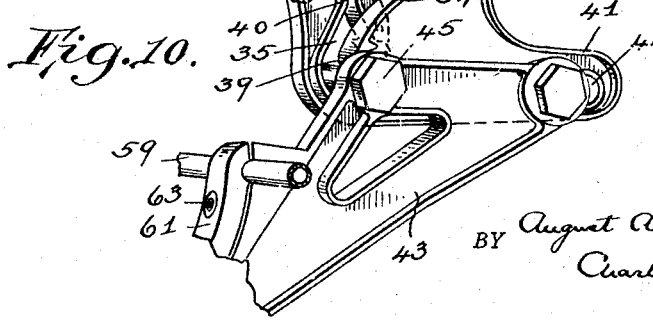
INVENTOR
August A. Roth
BY
Charles B. Mann Jr.
ATTORNEY Patented Sept. 22, 1925.

1,554,526

UNITED STATES PATENT OFFICE.

AUGUST A. ROTH, OF BALTIMORE, MARYLAND.

FENDER FOR MOTOR VEHICLES.

Application filed January 21, 1925. Serial No. 3,737.

*To all whom it may concern:*

Be it known that August A. Roth, a citizen of the United States, residing at Baltimore, in the State of Maryland, has invented certain new and useful Improvements in Fenders for Motor Vehicles, of which the following is a specification.

This invention relates to improvements in fenders for motor vehicles and has for one of its objects to provide a fender of improved construction which may be carried normally in an elevated position in front of the wheels and radiator but which may be tripped either manually or automatically by contact with a person whereby a scoop-frame which is part of the fender will be lowered toward the ground and thus serve to catch the person and prevent the latter from being run over by the wheels.

Another object of the invention is to provide improved means for attaching the structure to the vehicle frame and which will permit of various adjustments of the several parts to enable the structure to be attached to frames which vary considerably in width.

A further object of the invention is to provide improved hanger arms and guide plates for carrying the scoop-frame of the fender whereby said arms and plates may be attached to either the right or left side of the frame and on the inner or outer side of the latter whereby to avoid the necessity of providing a range of special sizes to suit vehicles of various makes.

With these, and other objects in view, the invention is illustrated in the accompanying drawings wherein, Fig. 1 shows the improved fender in top or plan view, portions of the guard frames being broken away to more clearly illustrate the scoop frame.

Fig. 2 illustrates the fender in side elevation as the same would appear if viewed on the line 2—2 of Fig. 1, and with the scoop-frame elevated.

Fig. 3 shows the same parts but with the scoop-frame in the lowered or operated position.

Fig. 4 illustrates a vertical sectional elevation taken on the line 4—4 of Fig. 1 to show the support means for the square trip-shaft.

Fig. 5 shows the upper portion of one of the trip-pawls, the view illustrating the structure in side elevation.

Fig. 6 illustrates an enlarged vertical section through the structure as viewed on the line 6—6 of Fig. 1.

Fig. 7 shows one of the supporting and guide-plates together with one of the intermediate scoop-frame arms, the parts being illustrated in perspective and the scoop-arm being in the lowered or operated position.

Fig. 8 illustrates a vertical cross-sectional detail through one of the bracket-arms which seats on the side frames of the chassis.

Fig. 9 shows a top or plan view of a portion of the structure, similar to that in Fig. 1, but with the bracket-arms that sustain the structure from the side frame attached so that the guide plate and scoop-frame arm will be located on the outer side of the chassis frame instead of on the inner side thereof as in Fig. 1.

Fig. 10 illustrates a perspective detail of the guide-plate, scoop-arm and trip-pawl, the latter being on the inner instead of outer side of the guide-plate and the scoop-arm being on the outer side of the guide-plate instead of the inner side thereof as it is in Figs. 1 and 7, and Fig. 11 shows another arrangement of the same parts all on the outer side of the chassis frame but with trip-pawl and the scoop-arm having the same relative arrangement as in Figs. 1 and 7, the only difference being that the devices are located on the outer instead of the inner side of the chassis frame.

In the drawing, the numeral 15, designates the opposite side frames of the vehicle chassis to which the improved structure is to be attached.

In practice the width between these side frames varies according to the make of the vehicle and it is therefore desirable and important to provide a structure which may be adjusted to conform to these variations in width.

In carrying out my invention I provide two bracket-arms 16 each of which is shaped to fit and seat upon the forward ends of the said side frames 15 and these two arms curve downwardly and project somewhat forward and below the front forward extremities 17 of said side-frames, as clearly shown in Figs. 2 and 3 of the drawings.

The lower forward end of each arm 16 has the rear half 18 of a bracket-support formed thereon and with which a forward half 19, of the support fits.

A rod 20, extends horizontally across the front ends of the side frames 15 and is rigidly held in the bracket-supports 18—19 and by preference this rod 20 is round.

It is to be understood that the rod 20 has neither a rotary or a longitudinal movement, but is rigidly clamped in the bracket-supports and held in a horizontal position so as to extend crosswise of the motor vehicle.

At the inner side of each frame 15, but in a horizontal plane below the extremities 17 of the same are vertically-disposed guide-plates 21.

There are therefore two of these guide-plates but, as they are of like construction, a description of the one will apply equally to the other.

Each guide-plate 21 has a forwardly-extending arm 22 at its upper forward edge and said arm is provided with clamping jaws 23 and 24. The clamping jaw 23 is integral and fixed with respect to the plate 21 and its arm 22, but the jaw 24 is pivoted at 25 to the fixed jaw and a bolt 26 serves to hold the two jaws together.

The clamping-jaws 23—24 straddle the horizontal rod 20 and are rigidly clamped about said rod so that the forward end of each guide-plate 21 is held entirely by the horizontal rod.

Each guide-plate 21 is provided near its rear upper edge with a plurality of perforations 27 so that a hanger-bar 28, may have its lower end bolted at one or more of said perforations to the guide-plate while the upper end of said hanger-bar may seat against the end of a horizontal lug 29 that projects laterally from the bracket-arms 16, and be secured to said lug by a bolt 30, as shown in Figs. 1–6 and 8 of the drawings.

Each guide-plate, near its upper edge and about midway between its forward and rear edges, is provided with a horizontal perforation 31, which latter forms a circular bearing for a similarly-shaped circular boss 32, that projects laterally from one side of a trip-pawl 33, which latter will presently be more fully described.

Beneath the bearing-perforation 31 each guide-plate has a slot of a peculiar formation in that said slot has an upper horizontal portion 34 and a downwardly and forwardly-inclined portion 35 with an off-set 36 at the lower end and at the rear side of said latter inclined portion.

The upper horizontal portion 34 of said slot has a front off-set 37 and a rear off-set 38, and by reference to Figs. 2 and 3 of the drawings, it will be noted that the off-set 36 at the lower end of the inclined slot has a forwardly-projecting upper hook-edge 39, while the front off-set 37 of the horizontal portion is provided with rearwardly-extending lower hook-edge 40. The purpose of these off-sets and hook-edges will presently be explained.

It will further be noted that each guide-plate 21, has a rear extension 41 at its lower edge and that a horizontal slot 42, is provided in said extension.

One important feature of the present invention is the fact that the bracket-arms 16 which are directly attached to the frames of the vehicle and the guide-plates 21 are both designed so that the necessity of producing parts in rights and lefts is entirely avoided, and further that guide-plates and the parts they support may be hung between the two vehicle frames 15, as in Fig. 1 of the drawing, or they may be hung or located on the outer sides of those frames as in Figs. 9 and 11 without any change whatever in the construction of either the arms 16 or the guide-plates 21. This interchangeability of arms and guide-plates enables the shifting about of many of the parts to enable the very same parts to be utilized on vehicles wherein the measurement or dimension between the side frames 15 or of the gage of the vehicle-wheels differs very materially as will more clearly appear hereinafter.

In the arrangements shown in Figs. 1 to 7 inclusive of the drawings, however, the bracket-arms 16 and guide-plates as well as the parts carried by the latter are all arranged with the guide-plates and their associated parts located between the side frames 15 and this arrangement will therefore now be explained.

With each guide-plate 21, there is associated a scoop-arm 43, said arms being best illustrated in Figs. 6 and 7 of the drawings.

Each scoop-arm has a broadened rear end, or at least is so shaped at its rear end as to have some part thereof extend along the sides of the rear slot 42, and the slots 34—35 of the guide-plates so that cross-pins or bolts 44, and 45 may pass through each rear end of the scoop-arm and also pass through the slots 42 and 34—35 of the said guide-plates. By thus extending the pins or bolts 44—45 through the scoop-arm and then freely through the slots 42—34—35, said rear ends of the scoop-arms will be hung from the guide-plates but in such manner that the scoop-arms may have a limited forward and rearward movement as well as an up or down movement with respect to said guide-plates.

The pin or bolt 44, and the movement of the latter in the slot 42, enables the scoop-arm to pivot and also to move forward or rearwardly while the pin or bolt 45, will, by moving in the slots 34—35, direct the movement of the scoop-arms.

In its preferred form each scoop-arm 43, has a substantially triangularly-shaped rear end which laps one side of the guide-plate and from said guide-plate the arm projects forwardly with substantially concavo-convex upper and lower surfaces 46—47 respectively.

The extreme forward end of each scoop-arm has two clamping-jaws 48, for a purpose that will presently be explained and the upper concave side of each arm is provided with a plurality of crosswise concavities 49, the purpose of which will presently be explained.

By reference to Fig. 1 of the drawing it will be seen that the two guide-plates are sustained at the rear of the rod 20 and in vertical planes at the inner sides of the two frames 15 of the vehicle and that the scoop-arms extend forwardly of and project under the said rod 20.

In further carrying out my invention I provide a horizontal trip-shaft 50 which extends from one guide-plate 21 to the other. While it is not essential to the invention, I form this trip-shaft of a squared or angular bar which shape has advantages as will now be pointed out, reference being made particularly to Figs. 1, 4, 5 and 7 of the drawings.

It has been pointed out that with each guide-plate 21 there is provided a trip-pawl 33, and that each pawl has a circular boss 32 at one side thereof which bosses enter and have bearing in the circular perforations 31 of the guide-plates.

By reference to Figs. 4 and 5 of the drawings, it will be seen that each boss 32, of the trip-pawls has a substantially squared opening 51 therethrough whereby to receive the end of the squared shaft 50. In arrangement of these devices shown in Figs. 1 to 7 the squared shaft ends 50 pass through the squared holes in the bosses and the trip-pawls are located on the outer vertical sides of the guide-plates but this location of the pawls with respect to the guide-plates is a mere matter of choice or expediency in as much as they may as readily be located on the inner sides of said guide-plates as shown in Figs. 9 and 10 of the drawings.

In any event the pawls 33 are secured on the shaft-ends by means of set-bolts 52.

Each pawl 33 has two prongs 53 and 54 respectively, the prong 53, being the front prong and short, like the thumb of a hand and the prong 54, being the rear prong and longer like the first finger of a hand. Between these prongs 53—54 of the pawls there is a slot into which the pin or bolt 45 of the scoop-arm will move or have position when the scoop arms are elevated and in the normal inoperative position.

It will thus be understood that the pawls 33 are mounted on the opposite ends of the squared shaft and that their pronged ends 53 and 54 hang pendantly so that the space between the prongs will form a slot which opens downwardly.

When the scoop-arms 43 are in their elevated positions the pins or bolts 45, will have position in the front off-set 37 in the horizontal slot 34 of the guide-plate and will be held up in said off-set by the hook-edge 40. At this time the pawl 33 will straddle the pin or bolt 45, as shown in Figs. 2 and 6 of the drawings, and the longer rear prong 54 of the pawl will press against the rear of the pin or bolt 45, and keep the same pressed forward into said off-set 37.

A coiled spring 55, is attached to each pawl 33, and these springs constantly pull the pawls forward so as to keep the rear prong 54 against the pin 45, as long as that pin is in the off-set 37 and thus prevent accidental dropping of the scoop-arm.

Obviously, as both pawls are mounted on the square shaft 50, a movement of either pawl will cause a like movement of the other pawl through that shaft-connection.

By reference to Figs. 4 and 7 of the drawings, it will be seen that each pawl 33, has a stop-lug 56, on its longer prong 54, which stop-lugs are designed to engage a corresponding lug 57 on the guide-plate adjacent the inclined slot 35, and by such engagement limit the forward swinging movement of the pawls.

In Fig. 7, the pawl 33, is presumed to be held back by the wire or hand-actuated connection 58, which is used to manually trip the device instead of waiting for an automatic operation as will presently be explained.

In addition to the two bracket-arms 16 and the guide-plates 21; scoop-arms 43, pawls 33 and the connecting shaft 50 between the pawls, the structure employs certain scoop and guard-frames which latter will now be explained, reference being made particularly to Figs. 1, 2, 3 and 6 of the drawings.

The scoop-frame is made up of a series of parallel horizontal bars 59 whose opposite ends are rigidly secured in side bars 60, and these parallel bars seat in the crosswise concavities 49 that are formed in the upper concave sides 46 of said scoop-arms. After the parallel bars 59 are seated in the concavities of said scoop-arms the entire scoop-frame may be adjusted with respect to the scoop-arms so that the two side-bars 60 will be equally spaced beyond the outer sides of the scoop-arms and when so positioned, suitable clamp-bars 61, each with a series of concavities 62 in their bottom edges, are seated on top of the series of parallel bars 59 and suitable socket-headed bolts 63, are screwed down through said clamp bars to clamp the parallel bars 59 down on the scoop-arms and thus rigidly hold the scoop-frame to said scoop-arms.

The scoop-frame side bars 60 have laterally-bent forward plug-ends 64, as shown in Fig. 1, and a connecting cross-tube 65, is engaged by said lug-ends and extends horizontally crosswise from one side-bar to the other. This cross-tube 65, is covered by rubber or other yielding tubing 66, and the clamping jaws 48 at the outer ends of the scoop-arms are clinched down tight around the tubing 66 and this supports and braces the tubes 65 when impact with an object is made.

By further reference to Figs. 1, 2 and 3 it will be noted that each side-bar 60 of the scoop-frame is provided with a block 67 of cushioning material, the purpose of which will presently be explained.

On the horizontal rod 20, I mount a guard-frame which latter, in this instance, is formed of three arms 68, which are freely mounted on the said rod so as to hang pendantly or be free to turn on the rod as the support for their forward ends is either removed or lowered. These arms are connected by a plurality of cross-bars 69 which also extend horizontally.

When the scoop-frame and arms 43 are elevated as in Fig. 2, the two end-arms 68, have their lower ends resting upon the cushion-blocks 67 of the scoop-frame to prevent rattling of the parts as the vehicle is in motion.

When the scoop-frame is tripped, either automatically or manually, and drops to the inclined position shown in Fig. 3, then the guard-frame will drop to a substantially vertical position until the free ends 70 of the side arms 68, come in contact with the rear ends of the two side bars 60 and by thus dropping, the guard-frame will close a gap that would otherwise be formed between the rod 20 and the rear end of the scoop-frame.

To provide a further guard above the rod 20, I mount on said rod a series of upwardly-extending arms 71 and these arms also sustain a series of horizontal cross-bars 72 which together form an upright frame. As the arms 71 are freely mounted on the rod 20, this latter frame would not remain in the desired upright position unless held in place. I therefore provide two latch-bars 73, which extend forwardly from the upright hanger bars 28 and have their forward ends hooked over one of the cross-bars 72 whereby to hold said upright frame in an up-standing position.

In practice the position of the upright frame is such as to prevent access to the hand-cranking mechanism of the vehicle engine but by releasing the latch bars 73 and swinging the frame down access to said cranking mechanism may readily be gained.

By again referring to Figs. 1, 2 and 3 it will be noted that a wire or equivalent device 74, extends forwardly, passes around pulleys 75 and 76 and then extends downwardly and is attached to the rear end of the scoop-frame. By means of this wire the frame may be lifted by the driver without requiring the latter to leave the driving seat in the car, in order to reset the device after it has been operated.

In Figs. 9 and 11 of the drawings precisely the same parts are employed in Figs. 1 to 8, but the arrangement of the elements is different.

In Fig. 9, the bracket arm 16 is attached to the side frame 15, with the lug 29 projecting outwardly and the guide-plate 21 is hung on the outer side of the frame as is also the scoop-arm 43. Also in this view the trip-pawl 33 is located at the inner side of the guide-plate 21.

In this Fig. 9 therefore the scoop-arm and pawl are located on the outer and inner sides respectively of the guide-plate whereas in Figs. 1 to 7 their positions with respect to the guide plate 21 are just the reverse, but the construction of the parts is precisely the same.

In Fig. 10, not only are the supporting parts arranged on the outer side of the side frame but in this view the scoop-arm 43 is located at the inner side of the guide-plate 21 while the trip-pawl 33 is located on the outer side of said guide-plate.

These two views in Figs. 9 and 10 are therefore designed to illustrate the interchangeability of the parts without any change whatever in the construction of those parts and because of this, provide a fender construction that may be attached to various types of motor vehicles.

In operation, the scoop-arms and frame carried thereby are normally held in a substantially horizontal position, as shown in Fig. 2 of the drawing.

This is effected by the pin 45 on the scoop-arm seating in the forward off-set 37 of the guide-plate slot 34, in which position the pin is held by the under hook-edge 40, and also by the prong 54 of the trip-pawl pressing forwardly at the rear side of the pin.

While in this elevated position, the inclined guard-frame 68—69 has its end bars resting upon the yielding blocks 67.

When the cross-tubes 65—66 of the scoop-frame strike an object the entire frame and scoop-arms will yield slightly in a rearward direction because of the slots 34—42 in the guide-plates 21 and when making this slight rearward movement the guide pins 45, will be moved rearwardly from the forward off-sets 37 whereupon they will immediately drop in the inclined slots 35 and seat in the rear off-sets 36 at the bottom of the guide-slots.

When the pins 45 seat in these rear off-sets 36, they will have position beneath the overhanging hook-edge 39 so that they cannot again move upwardly in the slots 35 until the scoop-frame and its arms are drawn forward and raised. This prevents an accidental lifting of the scoop-frame after it has dropped.

By connecting the two trip-pawls 33, a movement of one will effect a positive movement of the other so that one pawl will not release without effecting a positive release of the other, consequently both sides of the fender scoop will drop although contact may have been made only at one side of the scoop-frame.

Having described my invention, I claim,—

1. In a fender for motor vehicles the combination with a horizontal rod, of two spaced guide-plates attached to said rod, a scoop-arm associated with each guide-plate and each scoop-arm having a pivot connection with its guide-plate and also having a separate guide connection with the same plate; trip means for controlling the guide connection between the scoop-arm and the guide-plate and a scoop-frame carried by the scoop-arms.

2. In a fender for motor vehicles the combination with two spaced guide-plates each having an inclined guide slot and each also having a separate pivot-slot therein, of a scoop-arm associated with each guide-plate and each scoop-arm having means entering the guide-slot and a separate means entering the pivot-slot of its guide-plate and each scoop-arm extending forwardly from its guide-plate and a scoop-frame carried by the scoop-arms.

3. In a fender for motor vehicles the combination with two spaced guide-plates each having an inclined guide-slot with a forward off-set at the upper end of the slot and a rear off-set at the lower end of said guide-slot and each guide-plate also having a pivot-slot that is separate from said guide-slot, of a scoop-arm for and at the side of each guide-plate the rear end of each scoop-arm having a projection to enter the pivot-slot of its guide plate and each scoop-arm also having a guide-projection to enter the guide-slot of its guide-plate, means for normally holding the guide-projection of each scoop-arm in the forward off-set at the upper end of the said inclined slot, and a scoop-frame carried by the scoop-arms.

4. In a fender for motor vehicles the combination with two spaced guide-plates each having a horizontal pivot-slot and each also having an inclined guide-slot forward of the horizontal pivot-slot, the inclined guide-slot of each plate being provided with a forward off-set at its upper end and with a rear off-set at its lower end, a pronged trip-pawl at the side of each guide-plate with the prongs thereof lapping the guide-slot, a scoop-arm at the side of each guide-plate and each scoop-arm having a pivot projection to enter the pivot-slot of its guide-plate and a separate guide-projection to enter the guide-slot of its guide-plate the said guide-projection normally being between the prongs of the trip-pawl and held by the latter in the forward off-set of the said inclined guide-slot, and a scoop-frame carried by the scoop-arms.

5. In a fender for motor vehicles the combination with two spaced guide-plates each having an inclined guide-slot and each also having a horizontal pivot-slot at the rear of the inclined slot, of a scoop-arm at one side of each guide-plate and each scoop-arm having one projection to enter the inclined guide-slot and another projection to enter the horizontal pivot-slot of its guide-plate, a trip-pawl pivotally sustained so as to hang down on that side of the guide-plate opposite to that on which the scoop-arm is located and said trip-pawl engaging the guide-projection of the scoop-arm and a scoop-frame carried by the scoop-arms.

6. In a fender for motor vehicles the combination with two spaced guide-plates each having an inclined guide-slot and a horizontal pivot-slot at the rear of said inclined slot, of a scoop-arm coacting with each guide-plate and each scoop-arm having its rear end at one side of its guide-plate and at said rear end the scoop-arm having one projection to enter the inclined guide-slot and another projection to enter the horizontal pivot-slot, a trip-pawl above each inclined guide-slot and having prongs to straddle the guide projection on the scoop-arm to hold the latter in an elevated position in said inclined slot and a scoop-frame attached to and carried by the scoop-arms.

7. In a fender for motor vehicles the combination with a horizontal rod, of two spaced guide-plates each having connection with said rod and extending in a vertical plane at the rear of said rod, a scoop-arm for each guide-plate and each scoop-arm having its rear end pivotally and slidably connected to its guide-plate, the scoop-arms extending beneath the said rod and in front of the latter, means between the scoop-arms and bracket-plates for normally holding the rear ends of the scoop-arms elevated and a scoop-frame carried by the scoop-arms.

8. In a fender for motor vehicles the combination with a horizontal rod, of two spaced guide-plates each having connection with said rod and disposed in a vertical plane at the rear of said rod each guide-plate having an inclined guide slot and a separate pivot-slot, a scoop-arm for each guide-plate and each scoop-arm having two projections one in front of the other, the forward projection entering the inclined guide-slot of the guide-plate and the rear projection of the scoop-arm entering the pivot-slot of said guide-plate, a pivoted pawl engaging the forward projection on the scoop-arm for holding said projection in the upper end of the inclined slot said pawl and the projection it engages yielding rearwardly when the forward ends of the scoop-arms yield as the fender meets an obstruction, and a scoop-frame carried by the scoop-arms.

9. In a fender for motor vehicles the combination with a horizontal rod, of two spaced guide-plates each having connection with said rod and disposed in a vertical plane at the rear of said rod each guide-plate having an inclined guide slot and a separate pivot-slot, and each guide-plate also having an opening therethrough above the inclined guide-slot, a trip-pawl pivoted in each of the latter guide-plate openings and depending at the side of said guide-plates, a scoop-arm for each guide-plate and each arm having one projection to enter the inclined guide-slot of the guide-plate and another projection to enter the pivot-slot of said guide-plate, the pawl normally engaging the projection in the guide-slot to hold the scoop-arms up and a scoop-frame carried by the scoop-arms.

10. In a fender for motor vehicles the combination with a horizontal rod, of two spaced guide-plates each having connection with said rod and disposed in a vertical plane at the rear of said rod each guide-plate having an inclined guide slot and a separate pivot-slot, and each guide-plate also having a horizontal bearing opening extending therethrough above the inclined guide-slot, trip-pawls each having a boss at one side to enter the bearing opening in the guide-plate and each trip-pawl boss being provided with an opening, for an angular shaft, a shaft angular in cross-section and extending horizontally between the two trip-pawl bosses, a scoop-arm for each guide-plate and each arm having one projection to enter the inclined guide-slot of the guide-plate and another projection to enter the pivot-slot of said guide-plate, the pawl normally engaging the projection in the guide-slot to hold the scoop-arms up and a scoop-frame carried by the scoop-arms.

11. In a fender for motor vehicles the combination with two bracket-arms for attachment to a vehicle-frame and each arm having a lug at one side thereof, of a horizontal rod sustained by said bracket-arms, two spaced guide-plates each attached to said rod and extending rearwardly therefrom and each guide-plate being further sustained from said bracket-arm side-lugs, a scoop-arm pivotally connected to each guide-plate with means between said scoop-arms and guide-plates for guiding the arms when moved on their pivots and a scoop-frame carried by the scoop-arms.

12. In a fender for motor vehicles the combination with two bracket-arms for attachment to a vehicle-frame and each arm having a clamp device at its forward end, of a horizontal rod held by the clamp-devices of the bracket-arms, two spaced guide-plates each having a clamp-device to engage said horizontal rod, scoop-arms pivotally connected to the guide-plates and extending forwardly beneath the said rod, a scoop-frame carried by the scoop-arms, a guard-frame loosely mounted on said rod, and an upright frame also mounted on said rod and extending upwardly therefrom.

13. In a fender for motor vehicles the combination with two scoop-arms, of means for pivotally sustaining said arms at their rear ends to permit the front ends thereof to swing downwardly, a scoop-frame seated upon said scoop-arms and clamp-bars for clamping the frame down on the scoop-arms.

14. In a fender for motor vehicles the combination with two scoop-arms each having a series of crosswise recesses in their upper faces, of means for pivotally sustaining said arms at their rear ends to permit the forward ends thereof to swing vertically, a scoop-frame having a series of rods to seat in the recesses of the scoop-arms and clamping-bars seating over the bars of the frame and clamping the same down in said scoop-arm recesses.

In testimony whereof he affixes his signature.

AUGUST A. ROTH.